United States Patent [19]

Steinhagen

[11] 4,189,043
[45] Feb. 19, 1980

[54] AUTOMATIC SELF-ADJUSTING PLATE TYPE CLUTCH

[75] Inventor: Horst G. Steinhagen, Racine, Wis.

[73] Assignee: Twin Disc, Incorporated, Racine, Wis.

[21] Appl. No.: 878,816

[22] Filed: Feb. 17, 1978

[51] Int. Cl.² ............................................. F16D 13/42
[52] U.S. Cl. .............................. 192/111 A; 192/70.25; 188/196 BA; 188/71.9
[58] Field of Search ............ 192/111 A, 111 B, 70.25; 188/196 BA, 71.9

[56] References Cited
U.S. PATENT DOCUMENTS

| 426,567 | 4/1890 | Leverich | 192/111 B |
| 2,207,051 | 7/1940 | Colman | 192/111 A |
| 2,241,223 | 5/1941 | Spase et al. | 192/111 A |
| 2,280,355 | 4/1942 | Spase et al. | 192/111 A |

Primary Examiner—Leslie Braun
Assistant Examiner—David C. Reichard
Attorney, Agent, or Firm—James E. Nilles

[57] ABSTRACT

A friction plate-type clutch of the over-center type and having automatic adjusting means which is designed to sense cluth engaging force and make incremental clutch adjustments when the engaging force drops below a predetermined value.

8 Claims, 11 Drawing Figures

AUTOMATIC SELF-ADJUSTING PLATE TYPE CLUTCH

BACKGROUND OF THE INVENTION

It is known to provide over-center clutches equipped with adjustment devices which compensate for clutch plate wear. Some of these adjusters are manually reset when a decrease in clutch engaging effort or a decrease in clutch transmitted torque is noticed by the operator. In these particular prior art devices, resetting is generally accomplished with the clutch in the disengaged and stopped position and access to the adjusting mechanism must be provided for. The adjustment procedure usually consists of disengaging a locking device and turning an adjusting nut which reduces the distance between the clutch actuating mechanism and the clutch back plate, thereby compensating for clutch plate wear. It is furthermore usually necessary to measure clutch engaging effort after the adjustment has been made in order to assure proper clutch torque.

The prior art automatic clutch and brake adjusters sense clutch or brake clearance or stroke to compensate when these distances become excessive. An example of a prior art automatic adjuster is shown in the U.S. Pat. No. 3,752,286 which issued Aug. 14, 1973 and is entitled "Self-Adjusting Clutch". The device of that patent relates to a spring loaded clutch and the automatic adjustment is desirable in order to avoid excessive actuator stroke. In that patent device, the clutch torque or clamp-up force is maintained by springs and consequently the required accuracy of sensing and adjusting is quite minimal and an accuracy of about 0.030 inches is immaterial and direct sensing of such distances is not difficult.

Stated otherwise, some of these prior automatic adjusting devices are in part, relative position sensing units. In an over-center type clutch, the amount of adjustment is usually very minimal, perhaps on the order of 0.002 to 0.005 inches, and a position sensing device that could reliably detect and compensate for such changes would need to be very accurate and would not be entirely reliable due to machining variations, heat distortion of the clutch plates, and wear.

SUMMARY OF THE PRESENT INVENTION

The present invention provides an automatic adjusting means for an over-center, friction plate type clutch which eliminates the need for the adjustment, resetting, and checking procedure of prior art devices. The automatic adjuster provided by the present invention is designed to sense clutch engaging force and made incremental clutch adjustments when that force drops below a predetermined value.

A more specific aspect of the invention relates to an automatic clutch adjusting device which senses clutch engaging force to make the clutch adjustments accordingly, and which mechanism includes means for rotating a threaded adjusting ring and which means includes an oscillatable shaft having a one-way clutch and a sensor pin having calibrated springs and for rotating the shaft via said clutch to make the incremental adjustment. More specifically, the device provides a force detecting system including constant coefficient friction bushings for the shaft and anti-friction roller bearings between the shaft and a lever attached to and for axial shifting of a clutch clamp-up plate.

The automatic clutch adjusting mechanism provided by the present invention will repeat its adjustment during each engagement of the clutch until the clamp force is at the desired level and will then resist further adjustment.

These and other objects and advantages of the present invention will appear hereinafter as this disclosure progresses, reference being had to the accompanying drawings.

DESCRIPTION OF A PREFERRED EMBODIMENT

A conventional clutch housing H (FIG. 1) has anti-friction bearing assemblies B secured therein for rotatably journalling the shaft S of the clutch assembly. A clutch hub and back-up plate 1 is secured on the tapered end of the shaft S and rigidly held captive thereon by a threaded nut 1a in the conventional manner. A floating clutch plate 3 has a conventional spline connection to the hub 1 and is axially slideable thereon so as to clampingly engage or release the clutch plates 2 which are axially slideable on and splined to the driven member M. A clutch operating handle 4 through shaft 4a mounted in the housing oscillates the arm means 6 to cause the trunnions 7 and their associated bearing ring 7a to shift axially in either direction thereby carrying with it the associated, sliding sleeve 8. The sliding sleeve 8 is journalled for rotation in the bearing ring 7a by the anti-friction bearing assemblies 9 as is conventional practice.

Figure 1:
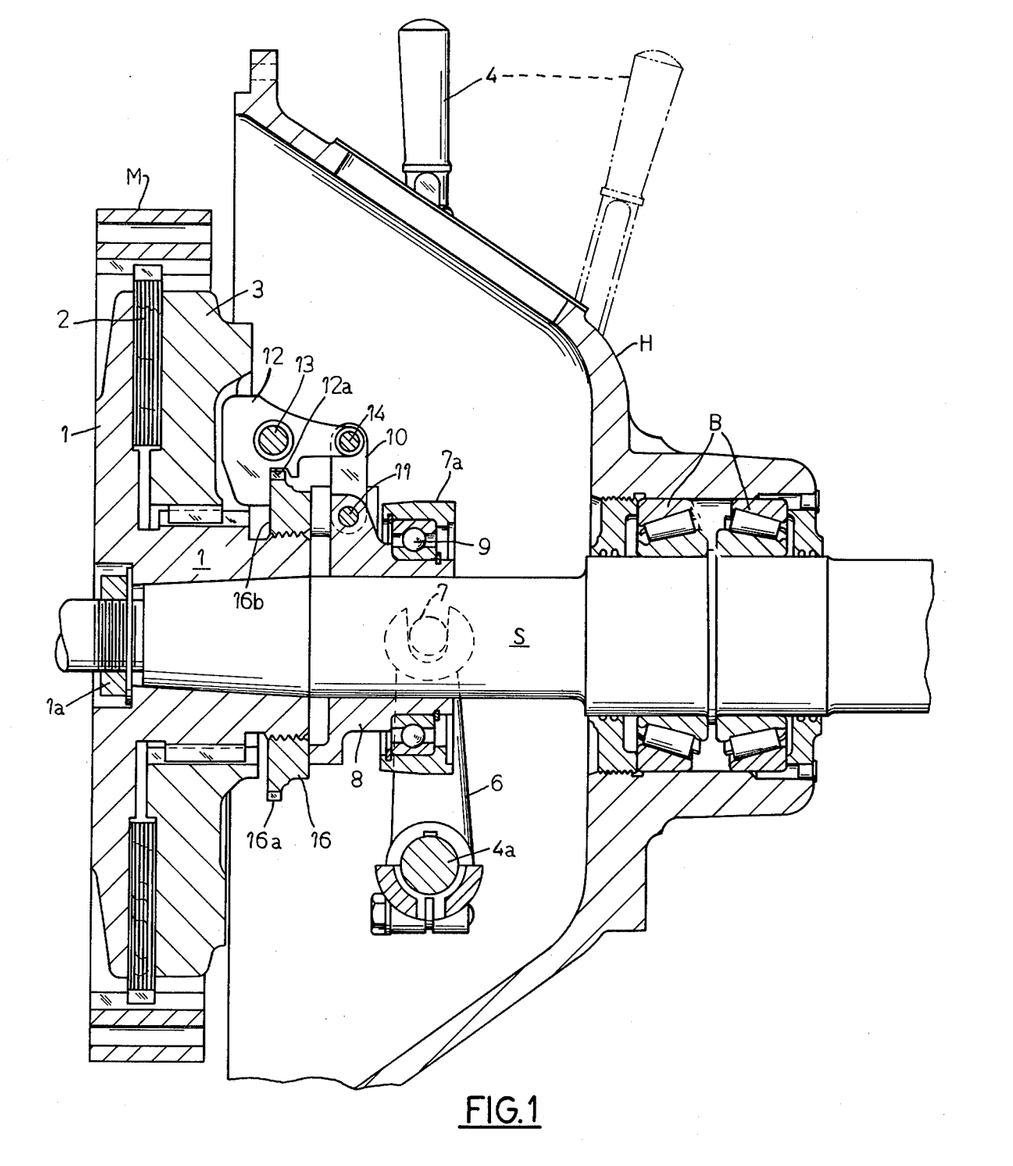
FIG. 1 is a longitudinal cross sectional view through the self-adjusting, over-center clutch assembly and showing the clutch in the engaged position.
Figure 2:
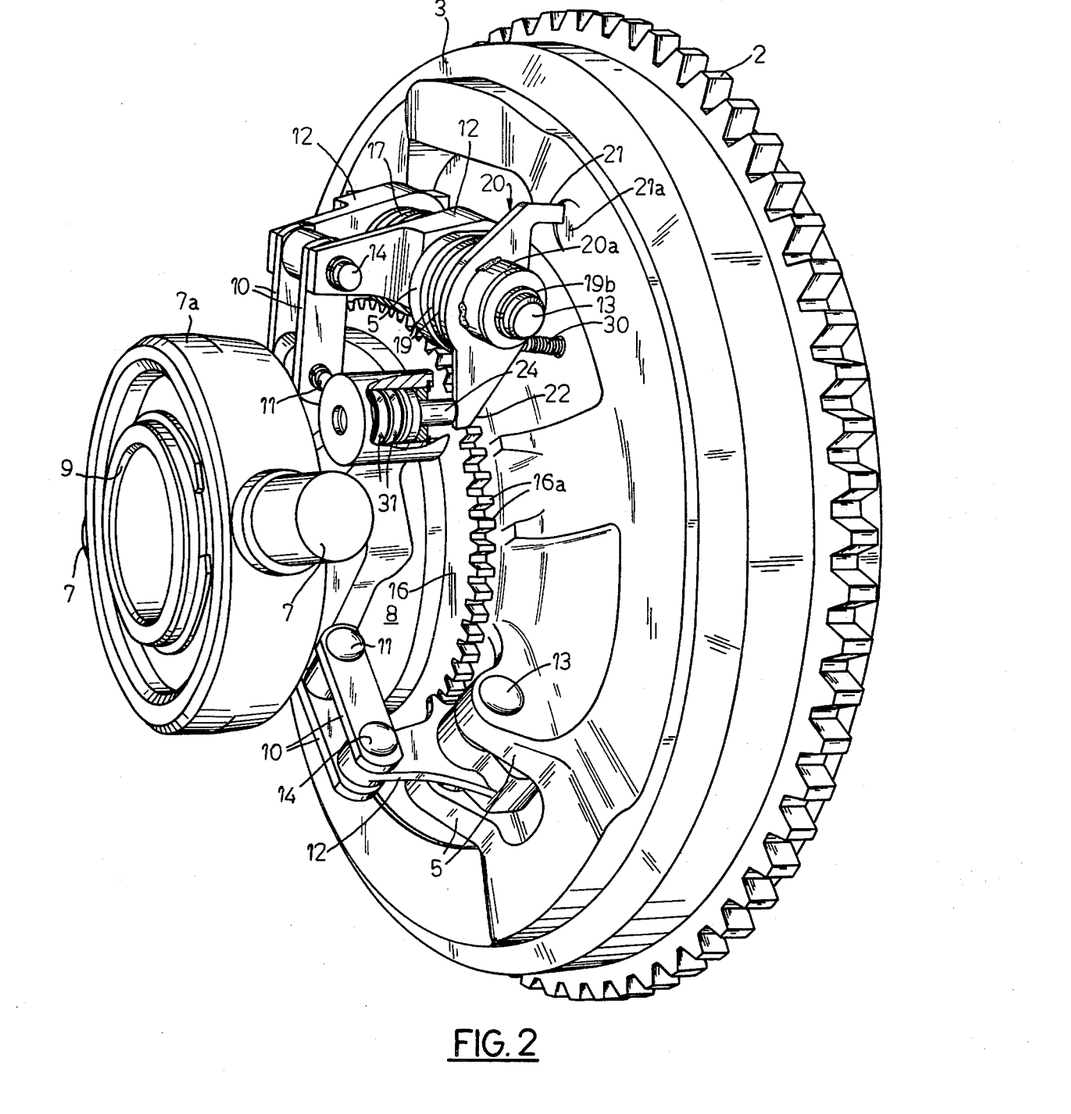
FIG. 2 is a perspective view with certain parts shown as broken away, in cross-section or removed for the sake of clarity in the drawing.
Figure 3:
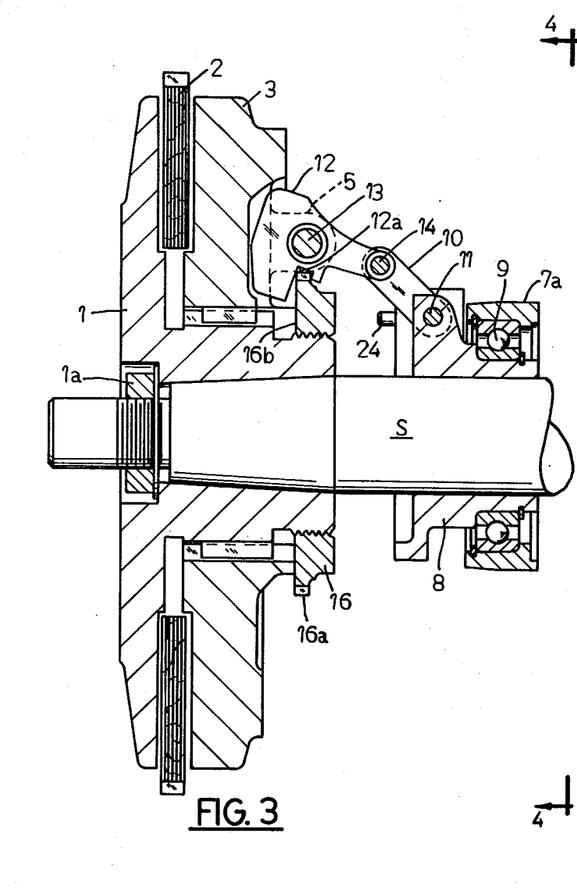
FIG. 3 is a longitudinal, cross-sectional view of a portion of the assembly as shown in FIG. 1, but on a reduced scale and showing the clutch in the disengaged position.
Figure 4:
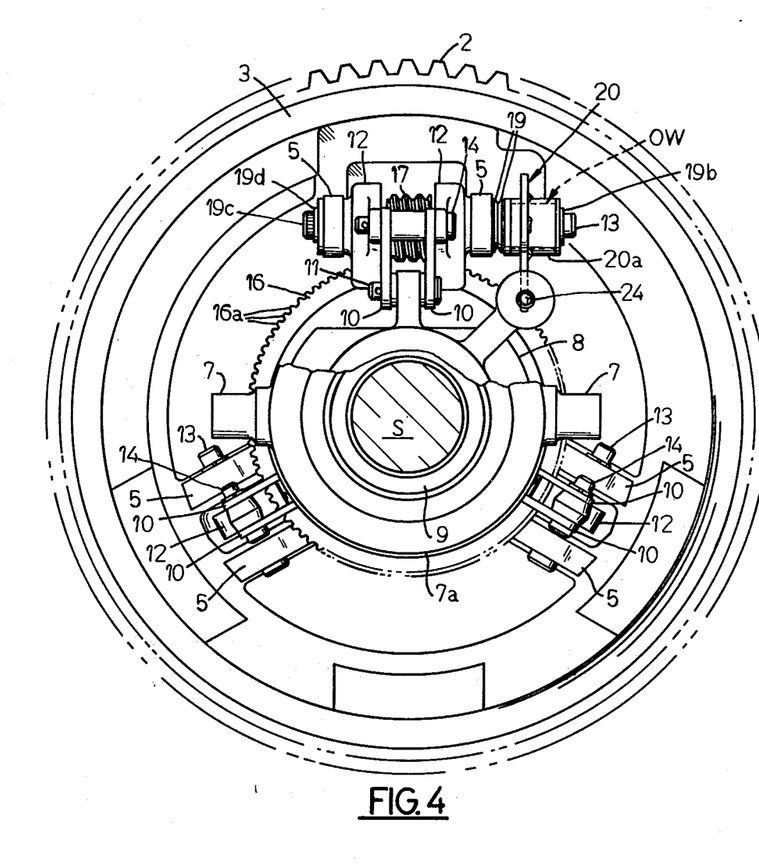
FIG. 4 is a transverse view, partially in section, and with some parts broken away for the sake of clarity, the view being taken generally along the line 4—4 in FIG. 3.
Figure 5:
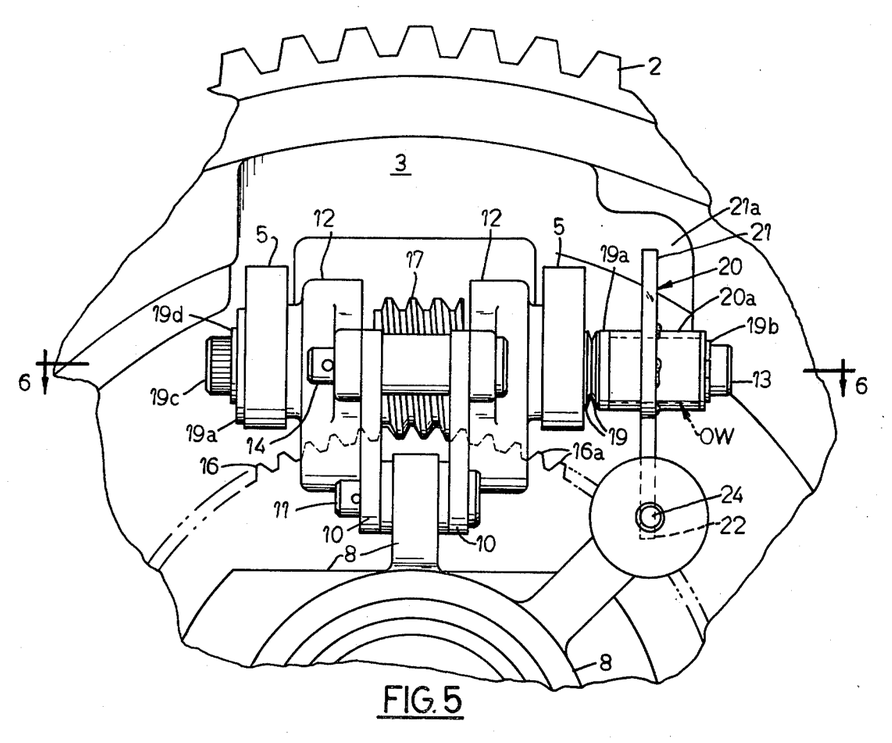
FIG. 5 is an enlarged, fragmentary view of a portion of the clutch assembly shown in FIG. 4.

Three sets of generally similar over-center lever and linkage means are provided between the sliding sleeve 8 and the floating plate 3 so that the latter can clampingly engage the clutch when the linkage is in the over-center position as shown in FIG. 1, and when the sliding sleeve is shifted in the opposite direction, the over-center linkage assumes the position shown in FIG. 3 to cause the clutch to be disengaged. These lever and over-center linkage means comprise a pair of links 10 pivoted on pin 11 to the sliding sleeve, a lever or lever means 12 pivoted on shaft 13 to the floating plate 3, and lever means 12 are in turn pivoted to the other end of links 10 by pin 14.

An adjusting ring 16 is threaded on the inner end of the hub 1 and levers 12 have recesses 12a which engage the outer periphery of the adjusting nut and are thereby effectively pivoted on the periphery of the nut so that when the handle 4 is operated in one direction or the other, the floating plate is caused to shift axially in clutch engaging or disengaging directions.

The three such levers and over-center linkages are connected between the sliding sleeve and floating plate at circumferentially equal distances around the shaft S and the clutch clamp up force is divided substantially equally between them. Therefore, the sensing of the force acting on one set can be used as a reference for the total clamping force.

One of the above mentioned lever and over-center linkage means is modified to include the self-adjusting mechanism provided by the present invention and this will now be described in greater detail.

It will be noted that the large adjusting nut 16 has a series of gear teeth 16a formed around its periphery and threads are formed at its inner diameter which engage with threads on hub 1 so that, as will appear, the adjusting nut can be rotated to axially position it in respect to the hub 1, thereby varying the effective pivot point of the levers 12 and consequently changing the clamp-up position of the floating plate to accommodate wear of the clutch plates.

Figure 6:
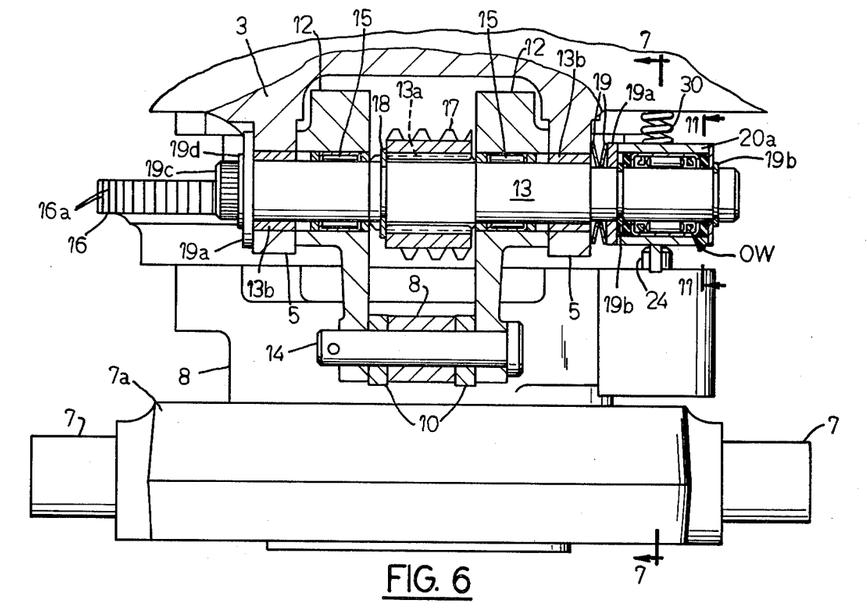
FIG. 6 is a sectional view taken generally along the line 6—6 in FIG. 5 and showing the clutch in the engaged position.
Figures 9, 10, 11:
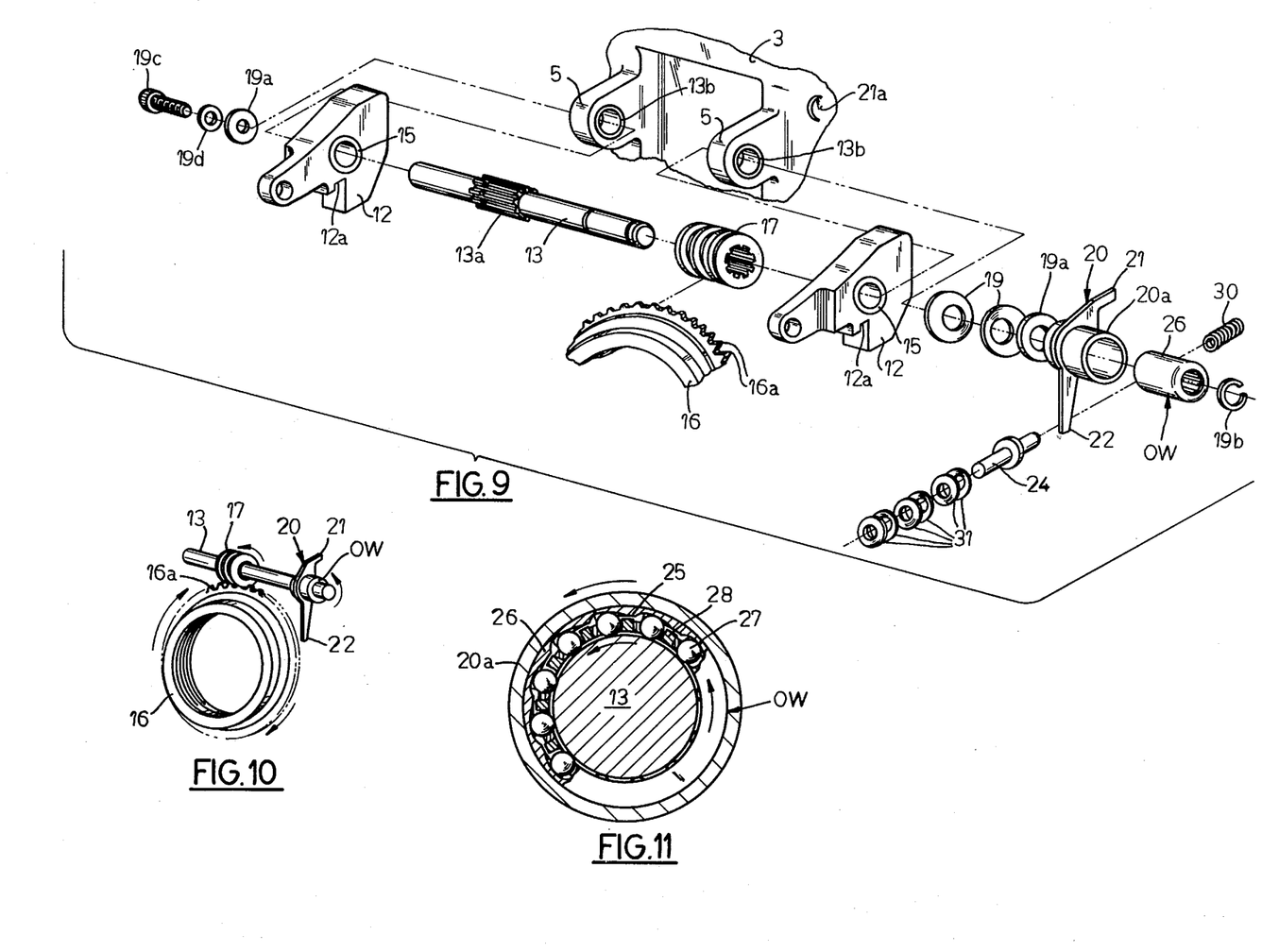
FIG. 9 is an exploded, fragmentary view in perspective and showing the sensor pin, actuator, adjusting worm, and adjusting nut and some of their associated parts.
FIG. 10 is a perspective view, on a reduced scale, of some of the parts shown in FIG. 9, but when in the assembled position.
FIG. 11 is a cross-sectional view with parts broken away of the one way clutch of the actuator, the view being taken along the line 11—11 in FIG. 6, but on an enlarged scale.

As shown clearly in FIGS. 6 and 9, among others, the lever shaft 13 is mounted in floating plate 3 being journalled in constant coefficient of friction bushings 13b that are mounted in the lugs 5 of the plate 3. The shaft 13 has a spline portion 13a intermediate its length and on which is slideably mounted the adjusting worm 17. Worm 17 has internal splines that mate with the splines 13a of the adjusting shaft 13. A retainer ring 18 limits axial movement of the worm on the spline. Spring washers 19, washers 19a, and snap ring 19b, and cap screw 19c, retainer washer 19d are also mounted on the shaft 13 as shown.

The adjusting worm also has worm threads around its periphery which are in constant mesh with the teeth 16a of the adjusting nut. Slight rotation of the shaft 13 and its associated adjusting worm 17 causes corresponding rotation of the adjusting nut 16 on its hub. This adjustment or rotation is small and accomplishes clutch wear take-up.

The lever 12 has anti-friction roller bearings 15 by which lever 12 is mounted on the shaft 13. Roller bearings 15 have negligible coefficient of friction and thus the friction between the lever 12 and shaft 13 is reduced to a point where the shaft 13 will not turn by rotation of the lever as previously mentioned. The shaft 13 is mounted in the plate 3 by means of constant coefficient of friction bushing 13b in lugs 5.

Figure 7:
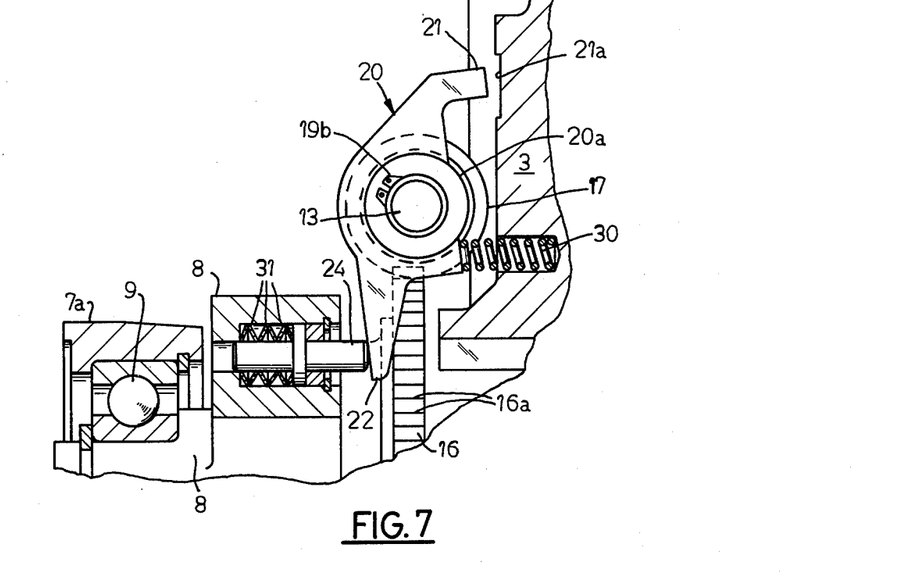
FIG. 7 is an enlarged, fragmentary view, partially in section, of the actuator for the adjusting worm of the adjusting nut in the disengaged position.
Figure 8:
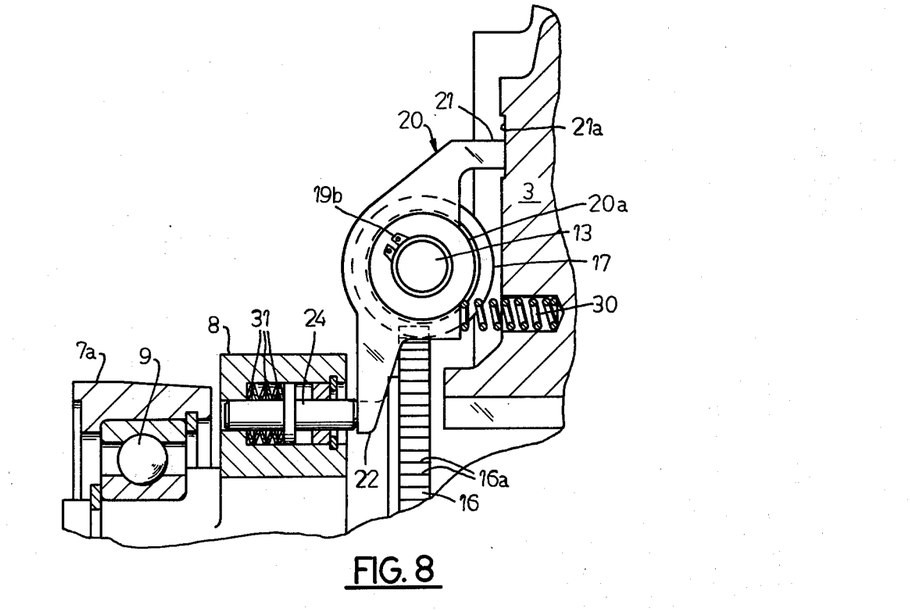
FIG. 8 is a view similar to FIG. 7, but showing the device in the engaged position.

Generally an actuator 20 is provided for causing slight rotation of the adjusting shaft 13, the actuator being periodically shifted from a position shown in FIG. 8 to a position shown in FIG. 7 by a sensor pin 24. A conventional one-way or over-running roller clutch OW is provided between the actuator and the adjusting shaft 13 all of which will now be described in more detail.

The actuator 20 is of plate-like construction and has two opposed ends, one of which 21 abuts against a reference surface 21a (FIG. 8) formed on the floating plate 3. The other end 22 of the actuator has sensor pin 24 engageable therewith and which can urge the actuator 20 to the engaged position as shown in FIG. 7. Belleville springs 31 carried on the sliding sleeve 8 act to resist axial motion of the sensor pin 24 with a calibrated force. The pin 24 contacts the actuator 20 when the sliding sleeve 8 is nearing the linkage on-center position. Actuator 20 is fixed, as by welding, to the housing 20a in which is press-fit an outer race 26 of the one-way clutch OW. The actuator transmits the force of the pin 24 via the one-way clutch OW to shaft 13. When the frictional resistance of shaft 13 in plate 3 is above a certain predetermined value, the pin 24 will compress springs 31 and shaft 13 will not be rotated. When the clamp force and with it the frictional resistance of shaft 13 drops due to clutch plate wear, spring 31 will exert sufficient force to hold pin 24 in its extended position and actuator 20 will pivot and rotate shaft 13. Rotation of shaft 13 causes rotation of worm 17 which is in tooth engagement with the adjusting nut teeth 16a. The adjusting nut 16 will resist rotation due to the frictional forces caused by the clamp force being transmitted to its thread and surface 16b (FIG. 1). Worm 17 will therefore be urged towards the left (FIG. 6). This motion is transmitted to retainer washer 18, shaft 13, retainer ring 19b (FIG. 6), back-up washer 19a and finally to Belleville springs 19 which will be compressed further. Worm 17 will return to its original axial position and thereby rotate adjusting nut 16 which affects clutch adjustment, when the clutch is released and the clamp force is removed from the adjusting nut because the axial force of spring washer 19 is sufficient to overcome the frictional resistance on the adjusting nut 16 in the clutch released condition.

To summarize, the clamp force detecting system includes the constant coefficient of friction bushings 13b for mounting shaft 13 in the floating plate 3, the roller bearings 15 in the lever 12, which reduces friction between the lever and the shaft 13 so the shaft won't turn by the lever, and sensor pin 24 and springs 31 which are calibrated to balance against the frictional torque of the shaft 13 in bushings 13b at the proper clamp-up force. The torque required to rotate shaft 13 and overcome the friction between the parts when the clutch is near the on-center position is a direct function of the clamp force. The spring force is such that the springs will compress when the clamp-up force and the frictional resistance of the shaft 13 in bushings 13b are at the proper level.

Spring washers 19 have a secondary function which is to produce frictional drag between shaft 13 and floating plate 3 via retaining rings 19b and washer 19a so as to prevent rotation of shaft 13 due to vibration or other unwanted influences. An actuator return spring 30 which is mounted in floating plate 3 urges the actuator 20 into its original position until the actuator end 21 contacts surface 21a of the floating plate in the clutch disengaged position as shown in FIG. 3. One-way clutch OW then allows release of the actuator 20 from shaft 13 in this direction of relative rotation. The pin 24 has then been pushed (to the left of FIG. 8) against the action of the spring washers 31. Spring washers 31 resist axial motion of pin 24 with a calibrated force.

The one-way clutch OW is a roller clutch and is operated in two modes, an operational or over-run mode and a lock mode. The operational mode is controlled by the direction of shaft 13 rotation with respect to the locking ramps 25 (FIG. 11) formed in the outer race of the clutch OW. Generally, the relative rotation between the outer race and housing 20a of the clutch and the shaft 13 causes rollers 27 to move away from their locking position against the locking ramp 25 and the housing 20a and clutch OW are thus free to over-run in one direction, that is, the shaft 13 is free to over-run in the other direction. In the locked mode, the relative roration between the housed clutch and the shaft 13 is opposite to that in the over-run position. The rollers 27, assisted by leaf-type springs 28 become wedged between the locking ramps 25 and the shaft 13 to transmit torque between the two members. The ramp angle of the cam ramps is quite low so that the rollers 27 wedge between the outer ramp and inner race, thereby creating radial forces that are sufficient to create frictional torques that are higher than the applied torque. The initiation of the wedge action is caused by the small leaf springs 28 that urge each roller 27 into contact with the ramp. As mentioned, when the relative rotation is reversed, the rollers 27 roll off the ramp and the frictional torques produced by the very light springs 28 is minimal thus allowing almost free relative rotation.

RECAPITULATION

The present invention provides a self-adjusting mechanism for an over-center clutch which includes a force detecting system that operates by sensing the clamp-up force of the clutch and makes incremental clutch adjustments when this clamp-up force drops below a predetermined value. The automatic clutch adjustment will repeat during each engagement of the clutch until the clamp-up force is at the desired level and will then resist further rotation.

I claim:

1. Automatic clutch adjusting mechanism for an over-center friction plate type clutch comprising, friction type clutch plates and a floating plate for clampingly engaging said clutch plates, a shaft in constant coefficient of friction bushings in said floating plate, lever means journalled by anti-friction bearing means on said shaft, an axially slideable sleeve for shifting said lever means, said mechanism also including a threadably adjustable ring abutting against said lever means for varying the clamp-up force applied by said lever means, a threaded worm mounted on said shaft for oscillation therewith and meshing with and for adjusting said ring to take up clutch plate wear, a one-way clutch mounted on said shaft for rotating the latter together with said worm in one direction, and a clutch clamp-up force sensing means carried on said sliding sleeve and abuttable against said one-way clutch for actuating the latter to thereby rotate said shaft and worm in a clutch wear take-up direction.

2. The mechanism set forth in claim 1 further characterized in that said clutch clamp-up force sensing means includes a sensor pin carried by said sliding sleeve and shiftable in one direction for actuating said one-way clutch in a clutch wear take-up direction, and calibrated spring means engaging said sensor pin for resisting axial motion of said pin in an opposite direction with a calibrated force.

3. Automatic clutch adjusting mechanism for an over-center friction plate type clutch comprising, friction type clutch plates and a floating plate for clampingly engaging said clutch plates, a shaft journalled in constant coefficient of friction bushings in said floating plate, lever means journalled by anti-friction bearing means on said shaft, an axially slideable sleeve for shifting said lever means, said mechanism also including a threadably adjusting ring abutting against said lever means for varying the clamp-up force applied by said lever means, a threaded worm mounted on said shaft for oscillation therewith and meshing with and for adjusting said ring to take up clutch plate wear, a one-way clutch mounted on said shaft for rotating the latter together with said worm in one direction, and a clutch clamp-up force sensing means carried on said sliding sleeve and abuttable against said one-way clutch for actuating the latter to thereby rotate said shaft and worm in a clutch wear take-up direction, said sensing means including a sensor pin and resilient means which are calibratingly biased against the torque of said shaft at a predetermined clamp-up force of said clutch.

4. The mechanism described in claim 3 further characterized in that said one-way clutch is of the roller type having an outer race including inclined locking ramps engageable by rollers, and including an actuator fixed to said outer race and engageable by said sensor pin for rotation thereby in a clutch engaging direction, and a reference surface on said floating plate for engagement by said actuator to limit rotation of the latter in a clutch disengaging direction.

5. Automatic clutch adjusting mechanism for an over-center friction plate type clutch comprising, a clutch hub and back-up plate, a floating plate splined to said back-up plate for axial shifting thereon, and friction clutch plates between said back-up and floating plates for being clampingly engaged, a shaft journalled in constant coefficient of friction bushings in said floating plate, lever means journalled by anti-friction bearing means on said shaft, an axially slideable sleeve for shifting said lever means, said mechanism also including a threadably adjustable ring mounted on said back-up plate, said lever means abuttable against said ring for applying clamp-up force to said plate via said floating plate, a threaded worm mounted on said shaft for oscillation therewith and meshing with and for adjusting said ring to take up clutch plate wear, a one-way clutch mounted on said shaft for rotating the latter together with said worm in one direction, and a clutch clamp-up force sensing means carried on said sliding sleeve and abuttable against said one-way clutch for actuating the latter to thereby rotate said shaft and worm in a clutch wear take-up direction.

6. The mechanism set forth in claim 5 further characterized in that said clutch clamp-up force sensing means includes a sensor pin carried by said sliding sleeve and shiftable in one direction for actuating said one-way clutch in a clutch wear take-up direction, and calibrated spring means engaging said sensor pin for resisting axial motion of said pin in an opposite direction with a calibrated force.

7. The mechanism described in claim 5 further characterized in that said one-way clutch is of the roller type having an outer race including inclined locking ramps engageable by rollers, and including an actuator fixed to said outer race and engageable by said sensor pin for rotation thereby in a clutch engaging direction, and a reference surface on said floating plate for engagement by said actuator to limit rotation of the latter in a clutch disengaging direction.

8. The mechanism described in claim 6 further characterized in that said one-way clutch is of the roller type having an outer race including inclined locking ramps engageable by rollers, and including an actuator fixed to said outer race and engageable by said sensor pin for rotation thereby in a clutch engaging direction, and a reference surface on said floating plate for engagement by said actuator to limit rotation of the latter in a clutch disengaging direction.

* * * * *